July 13, 1954   R. C. GAZLEY   2,683,598
ROTARY HYDRAULIC SHOCK ABSORBER
Filed Sept. 25, 1952   3 Sheets-Sheet 1

INVENTOR.
RICHARD C. GAZLEY
BY
ATTORNEY

July 13, 1954    R. C. GAZLEY    2,683,598
ROTARY HYDRAULIC SHOCK ABSORBER
Filed Sept. 25, 1952    3 Sheets-Sheet 2

INVENTOR.
RICHARD C. GAZLEY
BY
ATTORNEY

July 13, 1954
R. C. GAZLEY
2,683,598
ROTARY HYDRAULIC SHOCK ABSORBER
Filed Sept. 25, 1952
3 Sheets-Sheet 3
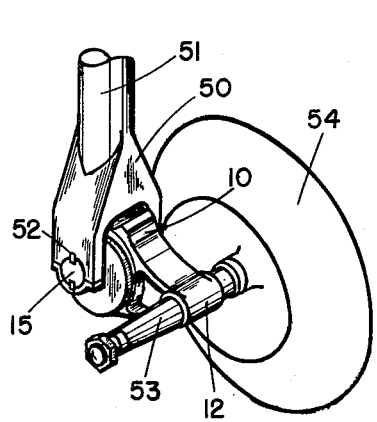
FIG. 5
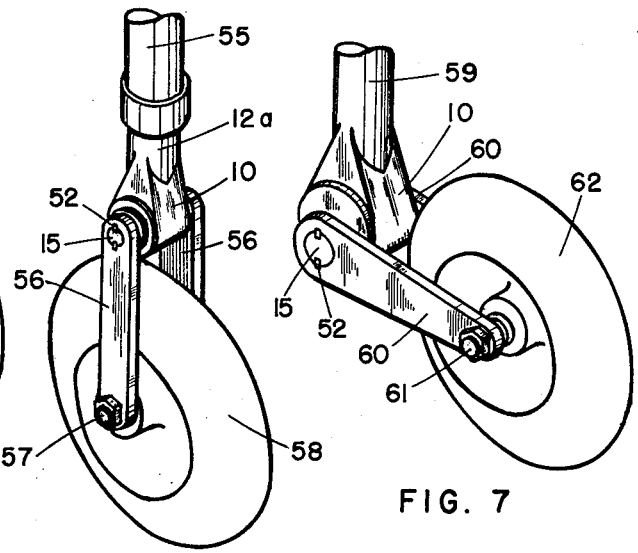
FIG. 6
FIG. 7
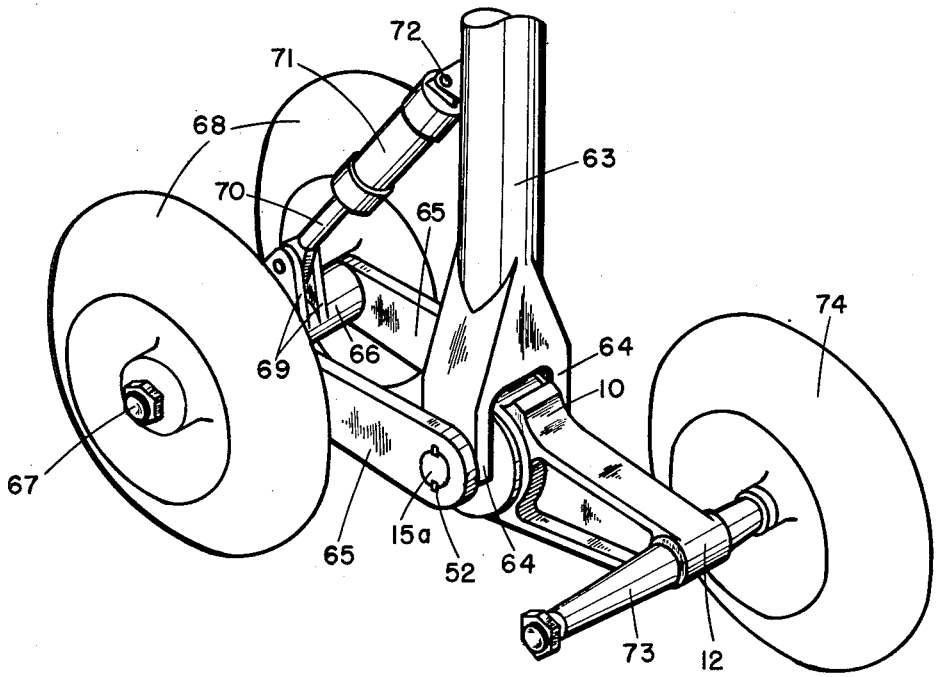
FIG. 8
INVENTOR.
RICHARD C. GAZLEY
BY
ATTORNEY Patented July 13, 1954

2,683,598

UNITED STATES PATENT OFFICE 2,683,598

ROTARY HYDRAULIC SHOCK ABSORBER

Richard C. Gazley, Shaker Heights, Ohio, assignor to The Cleveland Pneumatic Tool Company, Cleveland, Ohio, a corporation of Ohio Application September 25, 1952, Serial No. 311,483

8 Claims. (Cl. 267—64)

This invention relates broadly to shock absorbers, but more particularly to rotary shock absorbers especially adapted for use with airplane landing gears.

One of the main objects of this invention is to provide a shock absorber of simple construction and operation, designed to occupy a smaller space than the conventional telescoping shock absorber and to permit landing gear configurations heretofore unattainable by the use of telescopic shock absorbers.

Improvement in these directions is necessary because it is becoming impossible to provide stowage space for conventional landing gears in modern high-speed aircraft of the interceptor type particularly, without providing external protuberances on the airplane, detrimental to its efficiency.

Another object of this invention is to provide a rotary device which in addition to serving as a shock absorber, can also be used in conjunction with a conventional or telescoping shock absorber to provide hydraulic resistance against drag loads.

Other objects of this invention will be apparent from the following detailed description wherein similar characters of reference designate corresponding parts, and wherein.

Figure 1:
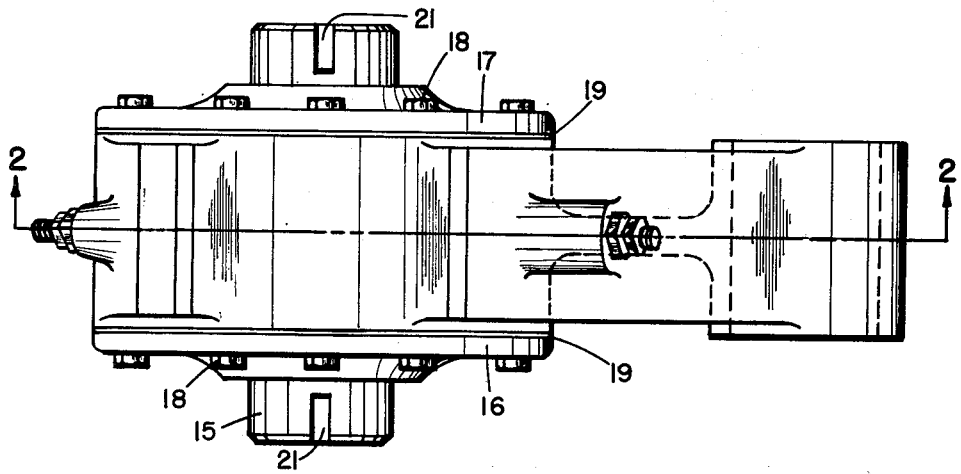
Figure 1 is a top plane view of a rotary shock absorber embodying the invention.

Figures 5 to 8 are views in perspective illustrating the invention used in conjunction with airplane landing gears. In Figure 5 it is shown incorporated in a dual wheel assembly, only one wheel being shown to better illustrate the invention. In Figure 7 it is shown in conjunction with a single wheel assembly, while in Figure 8 it is shown incorporated in a four wheel carriage. In Figure 6, it is shown associated with a telescoping shock absorber and used as a drag damper.

Referring to the drawings and more particularly to Figures 1 to 4, the rotary shock absorber consists of a substantially cylindrical casing 10 having a preferably integral arm 11 extending laterally therefrom and formed at its free end with an apertured terminal 12. Internally, casing 10 is provided with a substantially cylindrical bore 13, from the wall of which internally extend two diametrically opposed radial vanes 14 and 14'. Centrally mounted in the bore 13 for rotation therein, there is a shaft 15 adequately journalled within end plates 16 and 17 secured to the casing 10 by bolts 18. Fluid tight joints between end plates and casing are assured by ring packings 19 clamped therebetween, and between shaft and end plates by packings 20, thereby making bore 13 a closed and fluid tight bore. Shaft 15 has its end portions provided with keyways 21 located outside of the end plates 16 and 17, which end portions are thereby adapted to be connected to one part of a vehicle whose movements relative to another part connected to the terminal 12, are to be cushioned.

Casing vanes 14 and 14' extend longitudinally from one end plate to the other and each carry a strip 22 of sealing material such as rubber clamped between the vane and a pressure plate 23 by small bolts 24. The seal 22 contacts the shaft 15 and the interior of the end plates 16 and 17 to assure a fluid tight joint of the vane therewith.

Preferably formed integral with the shaft 15, there are two diametrically opposed vanes 25 and 25' radially extending therefrom to the wall of the bore 13. Like the casing vanes 14—14', the shaft vanes 25—25' extend from one end plate to the other and each carries a strip 26 of sealing material such as rubber clamped between the vane and a pressure plate 27 by bolts 28. In addition to the vanes 25—25', the shaft 15 is also provided with a preferably integral, radially extending, metering blade 29. This blade is longitudinally of the same length as vanes 14 and 25, but radially it is somewhat shorter to form a metering end 30, which extends as a straight edge from one end plate 16, 17 to the other.

Figure 2:
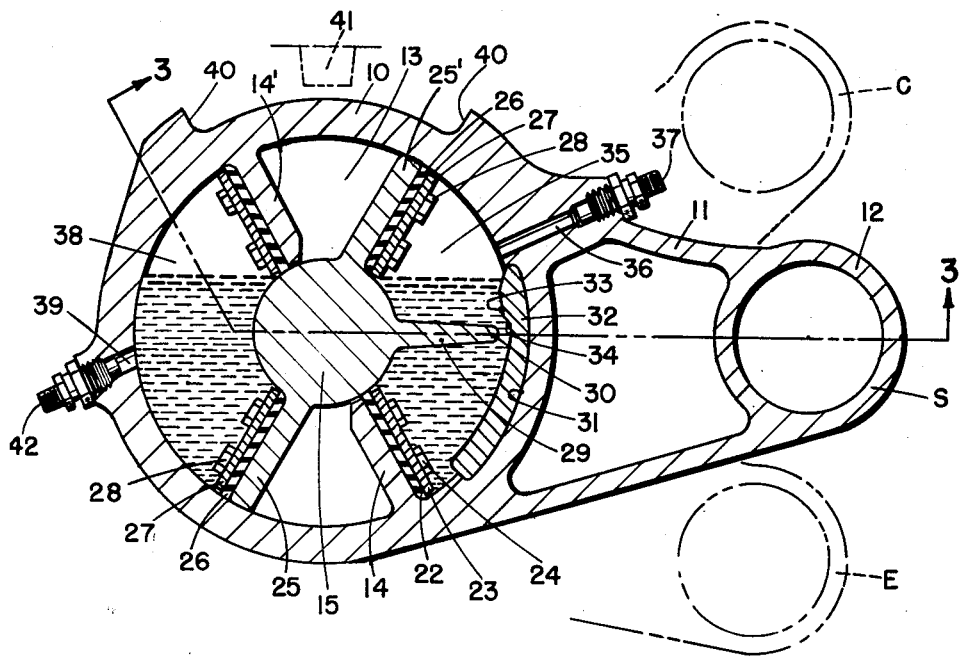
Figure 2 is a cross-sectional view taken on line 2—2 in Figure 1.
Figure 3:
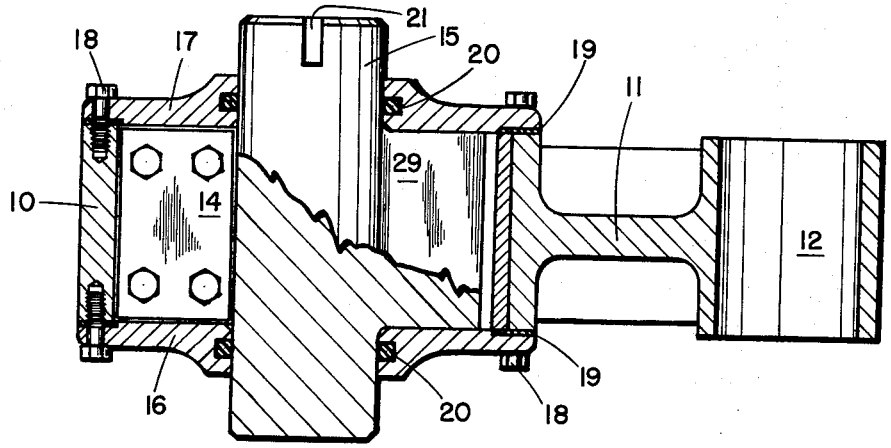
Figure 3 is a longitudinal sectional view taken on line 3—3 in Figure 2.
Figure 4:
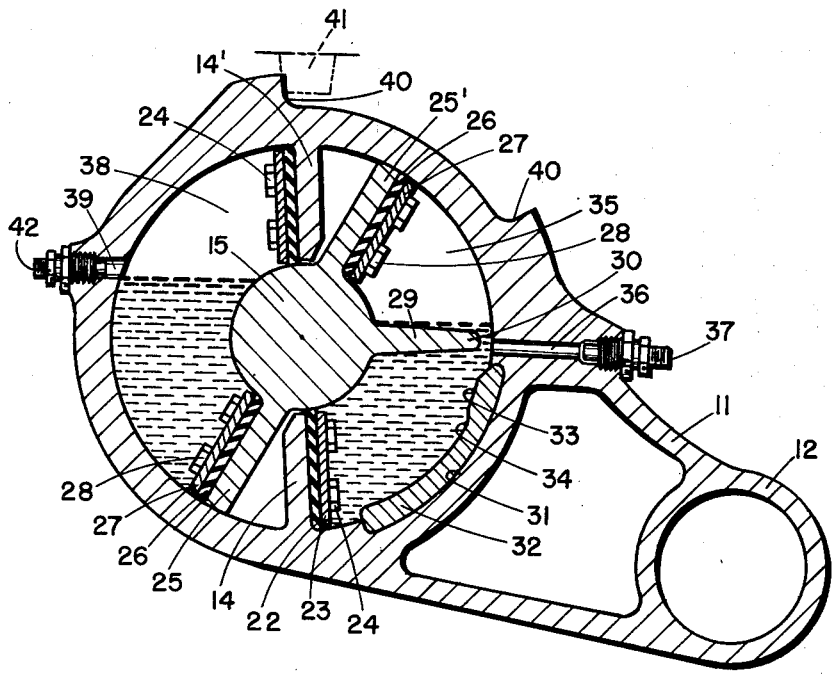
Figure 4 is a view corresponding to Figure 2, but illustrating the device in fully extended position.

Adjacent the metering end 30 of blade 29, the wall of bore 13 is recessed as at 31 to accommodate a removable variable orifice control plate 32, secured therein by any suitable means, not shown. This orifice plate extends longitudinally from one end plate to the other, and circumferentially it is of an extent calculated to remain opposite the metering end 30 of the blade 29 during the entire compression stroke or movement of the casing member 10 relative to the shaft member 15 in one direction, and during the major portion of the extension stroke or relative movement of said members in the other direction. As shown in Figures 2 and 4, the upper end of the orifice plate 32 is formed with an inwardly extending ridge 33, which when located opposite the end 30 of the metering blade 29, forms therewith a relatively small orifice. Ridge 33 is formed with sloping sides, the upper one as viewed in Figures 2 and 4, merges with the inner wall of the bore 13 and the upper end of the plate 32, while the lower side ends in a depression 34, which, when positioned opposite the end of the metering blade 29 as shown in Figure 2, forms therewith a relatively large orifice. From the depression 34 the inner face of the plate 32, taken in a clockwise direction in Figures 2 and 4, gradually extends inwardly to form with the end of the metering blade 29 a variable orifice of gradually diminishing capacity.

In the casing bore 13, between the casing vane 14 and the shaft vane 25', there is defined a segmental chamber 35 in which are located the metering blade 29 and the metering plate 32. This chamber may be filled with fluids such as oil and compressed air through a port 36 normally closed by an oil and air filler plug 37.

Similarly the space between casing vane 14' and shaft vane 25, defines a segmental chamber 38, which can be filled with fluids such as oil and compressed air through a port 39 normally closed by an oil and air filler plug 42.

The space between the vanes 14 and 25 and also between the vanes 14' and 25' defines segmental dead or non-effective chambers, which are preferably vented or constantly opened to the exterior of the casing 10 each through a small vent, not shown.

Formed on the external wall of the housing 10, there are two peripherally spaced shoulders 40 intended for engagement with a stop, such as 41, for limiting movement of casing 10 relative to shaft 15. In practice, stop 41 is generally located on a part of the carriage with which the device is operatively associated.

In practice, and especially when used in conjunction with airplane landing gears, the unit may be mounted in different manners, such as shown in Figures 5 to 8, hereinafter explained. But principally it is inserted between two elements whose relative movements are to be cushioned, with one element connected to the shaft 15 through its keyways 21, and the other element connected to casing 10 through its terminal 12.

In order to fill the unit with oil and compressed air preparatory to its operation, it is fully compressed by holding shaft 15 stationary and turning casing 10 counter-clockwise in Figures 2 and 4 until right-hand shoulder 40 engages stop 41, and casing terminal 12 assumes position C. When fully compressed, that is, with chambers 35, 38 at their minimum capacity, oil is introduced into chambers 35, 38, through filler plugs 37, 42, to a proper level. Thereafter the unit is fully extended by holding shaft 15 stationary and turning casing 10 clockwise until left-hand shoulder 40 engages stop 41, and casing terminal 12 assumes position E. When the unit is fully extended, chambers 35, 38 have reached their maximum capacity and are then charged with compressed air through filler plugs 37, 42. The amount of compressed air admitted into the chambers is calculated to create on the respective vanes 14, 25' and 14', 25 a predetermined pressure, so that when the unit is in the static position S, the movement due to the air pressure is equal to the movement due to the static load to which the unit is subjected.

While the unit is applicable to motor vehicles and the like, it is especially adaptable for use with airplane landing gears. As shown in Figure 5, the unit may be mounted within the bifurcated end portion 50 of a stanchion or strut 51, the upper end of which is adequately affixed to an airplane frame. In this instance the shaft 15 is fixed to the strut 51 by keys 52, while casing 10 is movable relative thereto and has its terminal 12 carrying a cross axle 53 on which are mounted dual wheels 54, one of which is omitted in Figure 5 to show better the general construction.

In Figure 6, the unit is used to provide hydraulic resistance against drag loads. In this application, the casing 10 is formed with a somewhat modified terminal 12a adapted to be affixed to the lower end of a conventional telescoping shock absorber 55, the upper end of which is of course attached to the airplane frame in the usual manner. In this installation, the casing 10 is stationary relative to its support 55, while shaft 15 is rotatable relative thereto. Fixed on the free ends of the shaft by keys 52 are two parallel arms 56 carrying a cross axle 57 on which is rotatably mounted the usual landing wheel 58. It will be understood that in this installation, the shock absorber 55 performs the function of the unit when installed in a manner such as shown in Figure 5, while the unit provides hydraulic resistance against pivotal movement of the wheel 58 on the shaft 15, resulting from drag loads to which the wheel is subjected, for instance, as it contacts the ground during landing.

In Figure 7, the casing 10 is somewhat modified to form the lower integral end of a rigid strut 59 having its upper end also attached to the airplane frame. In this instance the casing is stationary while shaft 15 is rotatable relative thereto and has affixed to its free ends by keys 52 two parallel arms 60 carrying a cross axle 61 on which is rotatably mounted a landing wheel 62. The arms 60 are substantially horizontal with the wheel 62 located behind the strut 59 relative to the direction of flight of the airplane, and capable of limited pivotal movement around shaft 15.

In Figure 8, the unit is shown used in conjunction with a four wheel carriage, wherein the main support comprises a rigid strut 63 having its upper end adequately affixed to the airplane frame, and its lower end bifurcated to form two parallel laterally spaced side walls 64. In this installation, both housing 10 and shaft 15a are rotatable relative to the supporting strut 63, the housing 10 being located between the side walls 64 with the free ends of the shaft 15a extending therethrough and supported in adequate bearings, not shown. The free end portions of shaft 15a are made somewhat longer than those of the regular shaft 15, and, outside of the side walls 64, have secured thereon by keys 52 the inner ends of two side arms 65. The outer ends of the arms 65 are united by a cross sleeve member 66 rigidly fixed thereto and through which extends a cross axle 67 carrying two landing wheels 68. Sleeve 66 has two laterally spaced lugs 69 projecting radially therefrom, which have pivotally secured thereto one end 70 of the usual centering piston assembly 71, the other end 72 of which is pivotally connected to the supporting strut 63. Casing terminal 12 also carries a cross axle 73 on which are operatively mounted two landing wheels 74, one of which is omitted in Figure 8 to show better the general construction.

In the operation of the device, from its static position shown in Figure 2 and above described, its movements toward further compression or extension are responsive to load variations to which it is subjected. For instance, during landing of the craft, the unit is subjected to an increased load effecting its further compression by reducing the volumetric capacity of the chambers 35, 38 and subjecting the compressed air stored therein to higher pressure, which tends to yieldingly resist such further compression. During such further compression, liquid in the chamber 35 is forcedly displaced from below to above the metering blade 29 as viewed in Figure 2, by flowing through the variable orifice defined between the end 30 of blade 29 and orifice plate 32. This results in energy absorption and effective damping the initial shock of landing. As previously stated, the orifice plate is shaped to gradually reduce the size of the orifice during the compression stroke of the unit, thereby affording a gradually increasing resistance to compression, which resistance is calculated to prevent sudden impact of shoulder 40 with stop 41 even under most severe and abnormal conditions.

During taxiing, the compressed air in the chambers 35, 38 yieldingly carries the load of the airplane, and when the airplane ascends, it causes the respective vanes of chambers 35, 38 to move away from each other and the extension of the unit. In this instance, the flow of the liquid from above to below the metering blade 29 as viewed in Figure 2, takes place at a gradually increasing rate until depression 34 reaches end 30 of blade 29, thereby enabling a relatively free and fast partial extension of the unit. Thereafter the liquid flow is greatly restricted by the ridge 33 of the metering plate 32 passing over the end 30 of blade 29, thereby damping and retarding the final portion of the extension stroke to prevent detrimental impact of left-hand shoulder 40 on stop 41.

From the foregoing, it will be understood that the unit provides two major component members consisting of a shaft and a casing member, both of which have fixed vanes. In operation, these members rotate with respect to each other forcing liquid to pass a variable orifice and compressing air in closed chambers. The hydraulic action during the compression stroke of the unit provides energy absorption, and efficient damping means during the extension stroke. The compressed air provides spring means upon which the airplane or other vehicle rides, and also returns the shock absorber to the extended position when the load is relieved.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A shock absorber comprising a casing member formed with a substantially cylindrical bore, a shaft member extending centrally through said bore, each of said members having fixed vanes extending radially therefrom and dividing said bore into several closed chambers, liquid and compressed air stored in said chambers, said members being rotatable with respect to each other to cause said vanes to vary the volumetric capacity of said chambers, a metering blade fixed to said shaft member extending radially therefrom into one of said chambers, and a metering plate fixed on the wall of said last chamber cooperating with the free end of said blade to form therewith an orifice through which liquid is adapted to flow during variation of the volumetric capacity of said last chamber.

2. A shock absorber comprising a casing member formed with a substantially cylindrical bore, a shaft member extending centrally through said bore, each of said members having fixed vanes extending radially therefrom and dividing said bore into several closed chambers, liquid and compressed air stored in said chambers, said members being rotatable relative to each other to cause said vanes to vary the volumetric capacity of said chambers, a metering blade in one of said chambers fixed to one of said members and extending radially therefrom toward the wall of the other, and a metering plate fixed on said wall cooperating with the free end of said blade to form therewith an orifice through which liquid is adapted to flow during variation in the volumetric capacity of said one chamber.

3. A shock absorber according to claim 2, in which said orifice varies in size during relative rotation of said members by virtue of the shape of said plate.

4. A shock absorber comprising a casing member having a substantially cylindrical bore, a shaft member extending centrally through said bore, said members having fixed vanes extending radially from one member to the other and dividing said bore into two closed chambers, liquid and compressed air stored in said chambers, said members being rotatable relative to each other to cause said vanes to vary the size of said chambers, a metering blade in one of said chambers fixed to one of said members and extending radially therefrom toward the wall of the other, and means on said wall cooperating with the free end of said blade to form therewith an orifice, variable in size upon relative rotation of said members, through which liquid is forced to flow during variation in the size of said one chamber.

5. A shock absorber comprising a casing member having a substantially cylindrical bore, a shaft member extending centrally through said bore, each of said members having two diametrically opposite radially extending vanes dividing said bore into two closed chambers, liquid and compressed air stored in said chambers, said members being rotatable relative to each other to cause said vanes to vary the volumetric capacity of said chambers and subject said compressed air to more or less pressure, and a blade in one of said chambers radially between said members fixed to one and spaced relative to the other to form a metering orifice through which liquid is forced to flow at a predetermined rate of speed during variation in the volumetric capacity of said one chamber.

6. A shock absorber comprising a casing member having a substantially cylindrical bore, a shaft member extending centrally through said bore, said members having fixed vanes extending radially from one member to the other and dividing said bore into two closed chambers, liquid and compressed air stored in said chambers, said members being rotatable with respect to each other into compressed or extended positions causing said vanes to reduce or enlarge respectively the sizes of said chambers, a metering blade in one of said chambers fixed to one of said members and extending radially therefrom toward the wall of the other, a metering plate fixed on said wall cooperating with the free end of said blade to form therewith an orifice through which liquid is adapted to flow during variation of the sizes of said chambers, and means on said metering plate automatically reducing the size of said orifice when said members approach said extended position.

7. A shock absorber comprising a casing having a substantially cylindrical bore, end plates closing the ends of said bore, a shaft member extending centrally through said bore and end plates, each of said members having fixed vanes extending radially therefrom and longitudinally from one end plate to the other to divide said bore into two closed chambers, liquid and compressed air stored in said chambers, said members being rotatable with respect to each other to cause said vanes to vary the volumetric capacity of said chambers, a metering blade in one of said chambers fixed to one of said members extending radially therefrom toward the wall of the other and longitudinally from one end plate to the other, and a metering plate fixed on said wall cooperating with the free end of said blade from one of said end plates to the other to form with said blade an elongated orifice through which liquid is adapted to flow during variation of the volumetric capacity of said one chamber.

8. A shock absorber comprising a casing member having a substantially cylindrical bore, a shaft member extending centrally through said bore, said members being adapted for connection to the parts of a vehicle whose relative movements are to be cushioned, fixed vanes on each of said members extending radially therefrom for fluid tight engagement with the other member, packing means carried by said vanes affording said fluid tight engagement, said vanes dividing said bore into two closed chambers, liquid and compressed air stored in said chambers, said members being rotatable relative to each other in either direction by virtue of the relative movements of the parts of the vehicle to which they are connected, said vanes during relative rotation of said members being adapted to reduce or enlarge the sizes of said chambers and submit compressed air stored therein to more or less pressure, a metering blade in one of said chambers fixed to one of said members and extending radially therefrom toward the wall of the other, and means on said wall cooperating with the free end of said blade to form therewith an orifice through which liquid is forced to flow during the reduction or enlargement of the size of said one chamber.

References Cited in the file of this patent

UNITED STATES PATENTS

| Number | Name | Date |
|---|---|---|
| 2,372,710 | Chisholm | Apr. 3, 1945 |
| 2,437,219 | Bachman | Mar. 2, 1948 |
| 2,498,976 | Wittman | Feb. 28, 1950 |
| 2,579,180 | Eldred | Dec. 18, 1951 |
| 2,581,912 | Brown | Jan. 8, 1952 |
| 2,582,426 | Greene | Jan. 15, 1952 |

FOREIGN PATENTS

| Number | Country | Date |
|---|---|---|
| 333,969 | Great Britain | Aug. 28, 1930 |
| 745,053 | France | Feb. 7, 1933 |